(12) United States Patent
Cho et al.

(10) Patent No.: US 7,383,562 B2
(45) Date of Patent: Jun. 3, 2008

(54) RESTRICTED RECEPTION DEVICE FOR DIGITAL CABLE BROADCASTING SYSTEM, AND RECEPTION SYSTEM AND METHOD USING THE SAME

(75) Inventors: Yong-Seong Cho, Daejeon (KR); Joon-Young Jung, Daejeon (KR); O-Hyung Kwon, Daejeon (KR); Chieteuk Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1101 days.

(21) Appl. No.: 10/439,818

(22) Filed: May 16, 2003

(65) Prior Publication Data

US 2004/0123330 A1    Jun. 24, 2004

(30) Foreign Application Priority Data

Dec. 23, 2002   (KR)   ................. 10-2002-0082868

(51) Int. Cl.
*H04N 7/20* (2006.01)
(52) U.S. Cl. .......................... 725/31; 725/70
(58) Field of Classification Search ............ 725/31–32, 725/63–64, 67–68, 70
See application file for complete search history.

(56) References Cited

U.S. PATENT DOCUMENTS

| 6,172,988 B1* | 1/2001 | Tiernan et al. ............. 370/473 |
| 2003/0219127 A1* | 11/2003 | Russ et al. ................. 380/239 |
| 2004/0181666 A1* | 9/2004 | Candelore .................. 713/160 |

FOREIGN PATENT DOCUMENTS

| JP | 2001-119357 | 4/2001 |
| KR | 1997-64233 | 9/1997 |
| KR | 1998-7164 | 3/1998 |

* cited by examiner

*Primary Examiner*—Chris Kelley
*Assistant Examiner*—Franklin S Andramuno
(74) *Attorney, Agent, or Firm*—Blakely, Sokoloff, Taylor & Zafman LLP

(57) ABSTRACT

A restricted reception device enabling a subscriber receiver to selectively receive broadcasting data transferred via a digital cable broadcasting network, includes: a demultiplexer for receiving broadcasting data and an ECM including a CW from the subscriber receiver, and demultiplexing them, the broadcasting data and the ECM being transferred through an in-band channel; an out-of-band channel signal processor for receiving an EMM from the subscriber receiver, and processing the EMM, the EMM being transferred through an out-of-band channel; a restricted reception processor for descrambling the scrambled broadcasting data using the ECM and the EMM received from the out-of-band channel signal processor; and a remultiplexer for multiplexing the descrambled broadcasting data received from the restricted reception processor, and sending the multiplexed broadcasting data to the subscriber receiver.

13 Claims, 6 Drawing Sheets

FIG.5

| | BIT | BYTE | FORMAT |
|---|---|---|---|
| EMM_table_section(){ | | | |
|   table_ID | 8 | 1 | uimsbf(0x80~0xBF) |
|   section_syntax_indicator | 1 | 2 | bslbf |
|   zero | 1 | | bslbf |
|   reserved | 2 | | bslbf |
|   section_length | 12 | | uimsbf |
|   if(section_syntax_indicator==1){ | | | |
|     table_extension | 16 | (2) | uimsbf |
|     reserved | 2 | (1) | bslbf |
|     version_number | 5 | | uimsbf |
|     current_next_indicator | 1 | | bslbf |
|     section_number | 8 | (1) | uimsvf |
|     last_section_number | 8 | (1) | uimsbf |
|   } | | | |
|   zero | 3 | 1 | bslbf |
|   protocol_version | 5 | | uimsbf |
|   format_identifier | 32 | 4 | uimsbf |
| number_of_channel | 16 | 2 | uimsbf |
| for(i=0; i<number_of_channels; i++){ | | | |
|   source_ID | 16 | 2 | uimsbf |
|   EMM_inside_data | N*8 | N | bslbf |
| } | | | |
| CEC_32 | 32 | 4 | rpchof |
| } | | | |

PRIVATE SECTION HEADER (rows from EMM_table_section through format_identifier)

EMM MESSAGE BODY (number_of_channel through EMM_inside_data)

CRC32 (CEC_32)

RESTRICTED RECEPTION DEVICE FOR DIGITAL CABLE BROADCASTING SYSTEM, AND RECEPTION SYSTEM AND METHOD USING THE SAME

CROSS REFERENCE TO RELATED APPLICATION

This application is based on Korea Patent Application No. 2002-82868 filed on Dec. 23, 2002 in the Korean Intellectual Property Office, the content of which is incorporated herein by reference.

BACKGROUND OF THE INVENTION (a) Field of the Invention

The present invention relates to a digital cable television broadcasting system. More specifically, the present invention relates to a restricted reception device for chargeable broadcasting services, and a reception system and method for a digital broadcasting system using the restricted reception device.

(b) Description of the Related Art

Conventionally, cable television (TV) broadcasting has provided fundamental audio and video services in the traditional analog system, but with the digitalization of broadcasting systems, the cable broadcasting system now also provides bi-directional audiovisual TV services as well as multimedia services. In particular, a digital cable broadcasting system in Korea that satisfies the requirements of the international standard, the OpenCable standard, is scheduled to provide services in the near future.

In Korea, chargeable TV services are largely classified into a cable broadcasting service and a satellite broadcasting service. The digital cable broadcasting system, which basically provides bi-directional services using a cable network, is much more advantageous in providing various services than the satellite broadcasting system that provides bi-directional services using a PSTN (Public Switched Telephone Network) or a PSDN (Public Switched Data Network).

FIG. 1 is a block diagram of a digital cable broadcasting system that is a general bi-directional broadcasting transceiver system.

The digital cable broadcasting system of the OpenCable standard has, as shown in FIG. 1, channels that are largely divided into a broadcasting channel (called "in-band channel" herein) for transmission of broadcasting data, and a bi-directional channel (called "out-of-band channel" herein) for transmission/reception of auxiliary data for broadcasting, or bi-directional communication data.

This broadcasting system comprises a broadcasting service provider 101 for providing audio/video data; a bi-directional service provider 102 for providing bi-directional contents; a broadcasting network adaptor 103 for constituting a broadcasting signal and sending it to the cable network; a bi-directional network adaptor 104 for performing bi-directional communication with cable subscribers, transmission of auxiliary data, and management of subscriber receivers; a broadcasting transmission medium 105 composed of an optical cable and a coaxial cable; a bi-directional network 106 for establishing a communication network such as ATM (Asynchronous Transfer Mode) or IP (Internet Protocol) through the cable network; and a subscriber receiver 107 for receiving broadcasting and bi-directional services.

The subscriber receiver 107 comprises a network interface unit 108 including a broadcasting network interface module 110 for receiving a broadcasting signal from the cable network, and a bi-directional network interface module 111 for sending and receiving bi-directional data; and a broadcasting reception unit 109 including a restricted reception module 112 for converting the broadcasting signal to audible/visible audio/video or data, and restricting the reception of the audiovisual data for chargeable broadcasting services.

In the above-constructed digital cable system, broadcasting programs are transferred on the in-band channels, and channel/program guide information and data related to restricted reception are transferred on the out-of-band channels. In regard to the restricted reception, in satellite broadcasting, ECM (Entitlement Control Message) and EMM (Entitlement Management Message) are transferred with the broadcasting data on the in-band channels. But, in cable broadcasting of the OpenCable standard, the ECM is transferred on the in-band channels for broadcasting data, and the EMM is transferred on the out-of-band channels for auxiliary data or bi-directional communication data. Specifically, the restricted reception system of cable broadcasting sends the EMM to the individual corresponding subscribers, which enables more efficient subscriber control.

The restricted reception system of the MPEG-2 (Moving Picture Experts Group-2) standard is used for satellite broadcasting. But the MPEG-2 restricted reception system is inapplicable to cable broadcasting, because ECM and EMM are independently transferred on a different channel as stated above.

The MPEG-2 restricted reception system encodes a control word (CW) for scrambling broadcasting data in the ECM and transfers the encoded CW with a CW-encoding key included in the EMM. Here, the ECM and the EMM are transferred in the form of MPEG-2 TS (Transport Stream) packets having a different packet identifier (PID) value. The PID value is equal to the value specified in the CA_PID field of the CA descriptor in the PMT (Program Map Table) and the CAT (Conditional Access Table) among the PSI (Program Specific Information) tables specified in the MPEG-2 standard.

To make a specific scrambled broadcasting program in the audiovisual form, the receiver detects a TS packet including the PAT table from the broadcasting data stream to parse the PAT table, determines the PID value of the PMT table of the corresponding program, and detects the TS packet having the PID value to parse the PMT table. Then the receiver acquires the PID value of the ECM-including TS packet by analyzing the PMT table, and detects the ECM-including TS packet to acquire the ECM.

On the other hand, decoding of the ECM is necessary in order to acquire the CW from the ECM. The receiver receives the TS packet including the CAT table to parse the CAT table, acquires the PID value of the EMM-including TS packet, and detects the EMM-including TS packet to acquire the EMM.

The receiver extracts an ECM decoding key from the EMM and decodes the ECM using the key to acquire the final CW. The CW thus obtained is transferred to the descrambler of the receiver, where it is used for converting the scrambled broadcasting program in an audiovisual form.

But the above-stated restricted reception method of the MPEG-2 system is impossible to apply to the digital cable broadcasting system of the OpenCable standard. The reason is because the three data transmission systems related to broadcasting on out-of-band channels in the OpenCable standard are different from the data transmission system of the MPEG-2 standard.

The three data transmission systems related to broadcasting through out-of-band channels are DVS-167, DVS-178, and DOCSIS (Data-Over-Cable Service Interface Specifications) systems. Among these methods, the DVS-178 system transmits data in the MPEG-2 TS form in a similar way to the traditional MPEG-2 system, and extracts the ECM and the EMM in the same manner as the MPEG-2 system.

However, the DVS-167 and DOCSIS systems transmit data in the form of ATM cell and IP packet, respectively, rather than MPEG-2 TS, so they cannot acquire the EMM-including PID value by analyzing the CAT table as with the traditional MPEG-2 system.

Moreover, in the OpenCable standard, the EMM is not transmitted for each chargeable service channel by channel, but rather for all the chargeable channels using out-of-band channels. Namely, there is a demand for redefining an EMM data constitution method and an EMM extracting and processing method at the receiver for the sake of restricted reception when using DVS-167 or DOCSIS to transmit data through an out-of-band channel.

SUMMARY OF THE INVENTION

It is an advantage of the present invention to provide a restricted reception device and a reception system and method using the restricted reception device that realizes a restricted reception using DVS-167 or DOCSIS as an out-of-band channel transmission method in a digital cable broadcasting system of the OpenCable standard.

In one aspect of the present invention, there is provided a restricted reception device that enables a subscriber receiver to selectively receive broadcasting data transferred via a digital cable broadcasting network, the restricted reception device including: a demultiplexer for receiving broadcasting data and an ECM (Entitlement Control Message) including a CW (Control Word) from the subscriber receiver, and demultiplexing them, the broadcasting data and the ECM being transferred through an in-band channel; an out-of-band channel signal processor for receiving an EMM (Entitlement Management Message) from the subscriber receiver, and processing the received EMM, the EMM being transferred through an out-of-band channel; a restricted reception processor for descrambling the scrambled broadcasting data using the ECM and the EMM received from the out-of-band channel signal processor; and a remultiplexer for multiplexing the descrambled broadcasting data received from the restricted reception processor, and sending the multiplexed broadcasting data to the subscriber receiver.

The restricted reception processor includes: an ECM memory for storing the ECM data; an EMM memory for storing EMM data of all channels being served to the subscriber receiver; a TS (Transport Stream) processing module for analyzing broadcasting data received from the demultiplexer to determine whether or not the broadcasting data are scrambled; a key matrix module for receiving the EMM data of a channel requested by the subscriber receiver from the EMM memory, and generating a key for decoding the ECM received from the ECM memory; and a descrambling module for decoding the ECM based on the key to generate a CW, descrambling the broadcasting data using the CW, and providing the descrambled broadcasting data to the remultiplexer.

The EMM transferred through the out-of-band channel includes: a private section header including a table ID for storing information specifying that a corresponding section is an EMM, and version information of the EMM; a message body including a source ID specifying a channel allocated for data and the corresponding EMM; and an error check unit.

In this case, the out-of-band channel signal processor checks the version information included in the private section header of the EMM received through the out-of-band channel to determine whether or not the EMM is changed, and stores the received EMM in the EMM memory when the EMM is changed. The EMM memory stores EMM data by source IDs of channels. Upon receiving information on a selected channel from the subscriber receiver, the key matrix module analyzes the information to generate a source ID, and the EMM memory based on the generated source ID, and searches EMM data corresponding to the source ID to generate a key.

In another aspect of the present invention, there is provided a reception system, which receives broadcasting data transferred from a digital cable broadcasting system, the reception system including a subscriber receiver and a restricted reception device. The subscriber receiver includes: an in-band channel receiver for receiving broadcasting data and a CW-including ECM transferred from the broadcasting system through an in-band channel, and demodulating the broadcasting data and the ECM; an out-of-band channel receiver for receiving an EMM transferred through an out-of-band channel, and demodulating the received EMM; and a first demultiplexer for demultiplexing the multiplexed broadcasting data into an audiovisual form. The restricted reception device includes: a second demultiplexer for demultiplexing the broadcasting data and the ECM received from the subscriber receiver; an out-of-band channel signal processor for processing the EMM received from the subscriber receiver; a restricted reception processor for descrambling the scrambled broadcasting data using the ECM and the EMM; and a remultiplexer for multiplexing the descrambled broadcasting data received from the restricted reception processor and sending the multiplexed broadcasting data to the subscriber receiver.

Here, the restricted reception processor includes: an ECM memory for storing the ECM data; an EMM memory for storing the EMM data of all channels served to the subscriber receiver; a TS processing module for analyzing the broadcasting data received from the demultiplexer to determine whether or not the broadcasting data are scrambled; a key matrix module for receiving the EMM of a channel requested by the subscriber receiver from the EMM memory, and generating a key for decoding the ECM received from the ECM memory; and a scrambling module for decoding the ECM based on the key to generate a CW, descrambling the broadcasting data using the CW, and sending the descrambled broadcasting data to the remultiplexer.

The subscriber receiver further includes: an out-of-band channel transmitter for transmitting a subscriber message from the restricted reception device through the out-of-band channel; and a controller for controlling reception and transmission operations of the subscriber receiver.

In further another aspect of the present invention, there is provided a reception method for receiving broadcasting data transferred from a digital cable broadcasting system, the reception method including: (a) when a subscriber selects a specific channel, receiving broadcasting data and a CW-including ECM transferred from the broadcasting system through an in-band channel, and storing the ECM in a first memory; (b) receiving an EMM transferred from the broadcasting system through an out-of-band channel to determine whether or not the EMM is changed, and storing the EMM in a second memory when the EMM is changed; (c) receiving the EMM of the channel selected by the subscriber from the second memory, and generating a key for decoding the ECM based on the EMM data; (d) decoding the ECM based on the key to generate a CW, and descrambling the broadcasting data using the CW; and (e) converting the descrambled broadcasting data to an audiovisual form.

Here, the EMM transferred through the out-of-band channel includes: a private section header including a table ID for storing information specifying that a corresponding section is an EMM, and version information of the EMM; a message body including a source ID specifying a channel allocated for data and the corresponding EMM; and an error check unit.

In this case, the step (b) includes: checking the table ID of the private section header transferred through the out-of-band channel to determine whether or not the received section is an EMM; checking the version information of the private section header to determine whether or not the EMM is changed, when the section is an EMM; and storing the received EMM by channels in the second memory, when the EMM is changed.

In the present invention of this aspect, the data transferred through the out-of-band channel are transferred according to either of DVS-167 or DOCSIS (Data-Over-Cable Service Interface Specifications).

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 5 is a detailed structure map of the EMM in accordance with an embodiment of the present invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

As described previously, there is a demand for redefining an EMM data constitution method and an EMM extracting and processing method at the receiver so as to realize restricted reception using DVS-167 or DOCSIS as an out-of-band channel transmission method in a digital cable broadcasting system of the OpenCable standard. Accordingly, the embodiment of the present invention is directed to a restricted reception device for processing an EMM transferred by DVS-167 or DOCSIS, and a reception system and method using the restricted reception device.

Figure 1:
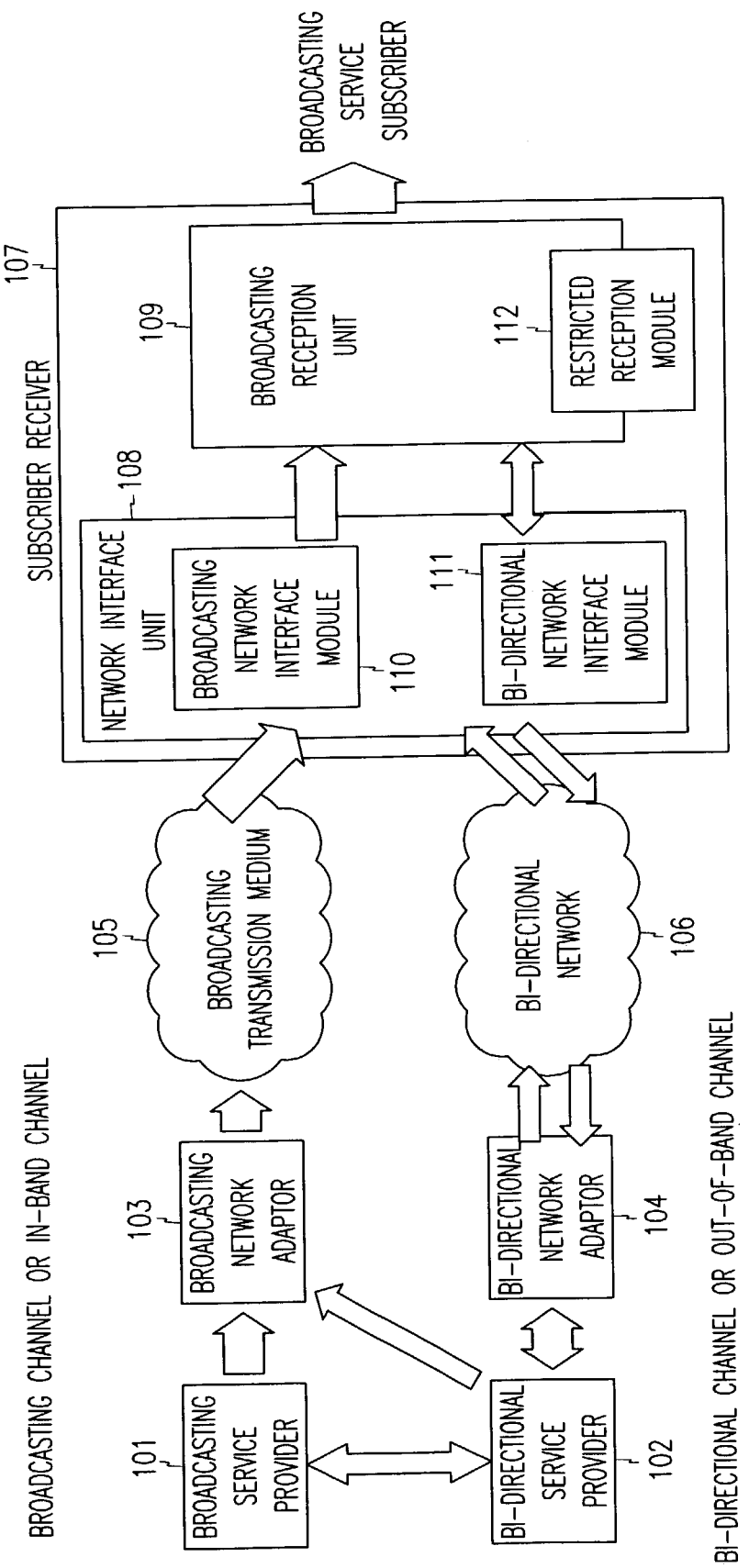
FIG. 1 is a block diagram of a general bi-directional broadcasting transceiver system.
Figure 2:
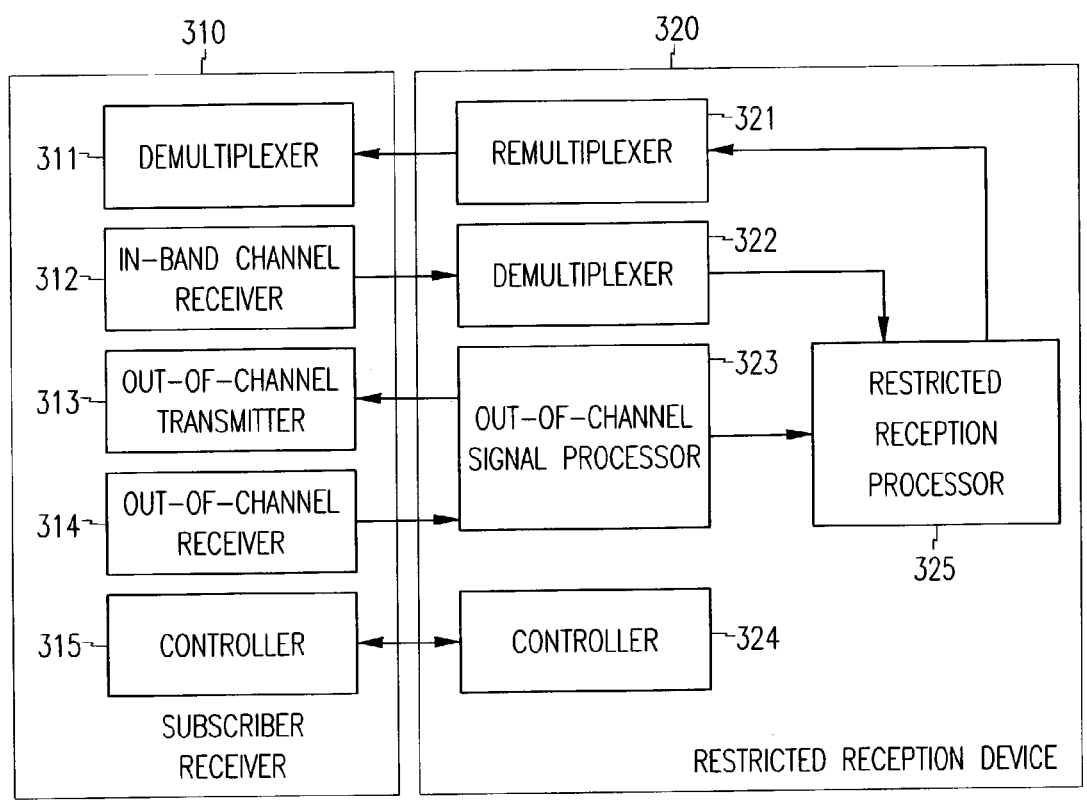
FIG. 2 is a block diagram of a reception system of a digital cable broadcasting system according to an embodiment of the present invention.

FIG. 2 is a block diagram of a reception system according to an embodiment of the present invention. The reception system according to the embodiment of the present invention comprises, as shown in FIG. 2, a subscriber receiver 310, and a restricted reception device 320. The reception system of this structure is classified according to the structure of the receiver as specified in the OpenCable standard.

The subscriber receiver 310 comprises an in-band channel receiver 312 for tuning in-band channel signals (e.g., MPEG-2 TS data such as broadcasting data, ECM, etc.) and demodulating them; an out-of-band channel receiver 314 for tuning out-of-band channel signals (e.g., EMM, etc.) and demodulating them; a demultiplexer 311 for demultiplexing multiplexed data received from the restricted reception device 320 into an audiovisual form; an out-of-band channel transmitter 313 for transmitting a subscriber message received from the restricted reception device 320 on an out-of-band channel; and a controller 315 for controlling the whole operation of the subscriber receiver.

The restricted reception device 320 comprises a demultiplexer 322 for demultiplexing the MPEG-2 TS data received from the in-band channel receiver 312 of the subscriber receiver 310; an out-of-band channel signal processor 323 for processing data received from the out-of-band channel receiver 314 of the subscriber receiver 310 and converting the subscriber message to a transmittable form, and sending the processed data and message to the out-of-band channel transmitter 313 of the subscriber receiver 310; a restricted reception processor 325 for descrambling the scrambled TS data using the demultiplexed MPEG-2 TS data and ECM data from the demultiplexer 322 and the EMM received from the out-of-band channel signal processor 323; a remultiplexer 321 for multiplexing the demultiplexed MPEG-2 TS data received from the restricted reception processor 325; and a controller 324 for controlling the whole operation of the restricted reception device.

Figure 3:
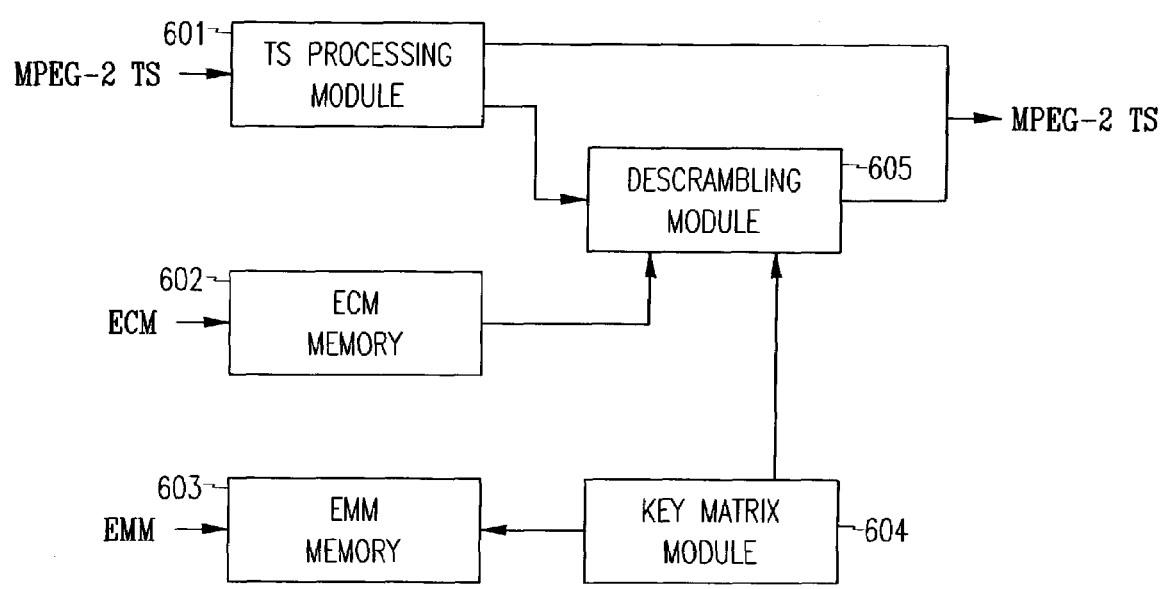
FIG. 3 is a block diagram of the restricted reception processor shown in FIG. 2.

FIG. 3 is a detailed block diagram of the restricted reception processor 325 according to the embodiment of the present invention.

The restricted reception processor 325 comprises, as shown in FIG. 3, a TS processing module 601 for analyzing input TS data to determine whether or not the TS data are scrambled; an ECM memory 602 for storing periodically changing ECM data for the corresponding channel; an EMM memory 603 for storing periodically changing EMM data for all the channels receiving the service; a key matrix module 604 for receiving the EMM data for the corresponding channel and generating a key for decoding the ECM; and a descrambling module 605 for descrambling the scrambled TS data using the CW generated from the ECM decoding.

Now, a description will be given as to the operation of the restricted reception device and a reception system using the device according to the embodiment of the present invention.

First, the cable broadcasting system of the OpenCable standard transfers the ECM through an in-band channel used for transmission of broadcasting data, and the EMM through an out-of-band channel used for transmission of auxiliary data and bi-directional communication data.

To process scrambled broadcasting data when a subscriber desires to receive a specific chargeable channel service, the reception system searches a TS packet including a PAT table among the data received through the in-band channel as in the MPEG-2 system, parses the PAT table to acquire the PID value of a PMT table of the program, searches a TS packet having the PID value, and parses the PMT table. Subsequently, the system acquires the PID value of the ECM-including TS packet by analyzing the PMT table, and searches a TS packet including an ECM to acquire the ECM. The ECM thus obtained is decoded using the corresponding EMM transferred through the out-of-band channel to obtain a CW for descrambling.

However, data are transmitted through the out-of-band channel by DVS-167 or DOCSIS in the embodiment of the present invention. For restricted reception, the structure of the EMM can be defined as follows.

Preferably, the EMM has a different value by service channels. If the EMM has a same value for all channels, the ECM for all channels can be decoded from one EMM, making it impossible to selectively provide services with necessary channels such as a package (channel package) service. An approach of operating the EMM differently by package services may be considered. But, with an overlapped channel between packages, there are some cases where different EMMs cannot be used among the packages.

Therefore, in the embodiment of the present invention, the EMM has a different value for the respective channels and only the EMMs of channels subscribed to the service are transferred to each subscriber.

The cable broadcasting service is mainly provided as a package service, so the EMM receiver groups are defined by the respective packages and the EMMs are transferred for the respective groups. The EMM, transferred in the form of an ATM cell or IP packet through an out-of-band channel, can be transmitted to the corresponding subscriber using a VCI (Virtual Channel Identifier)/VPI (Virtual Path Identifier) or an IP address for each receiver group.

Figure 4:
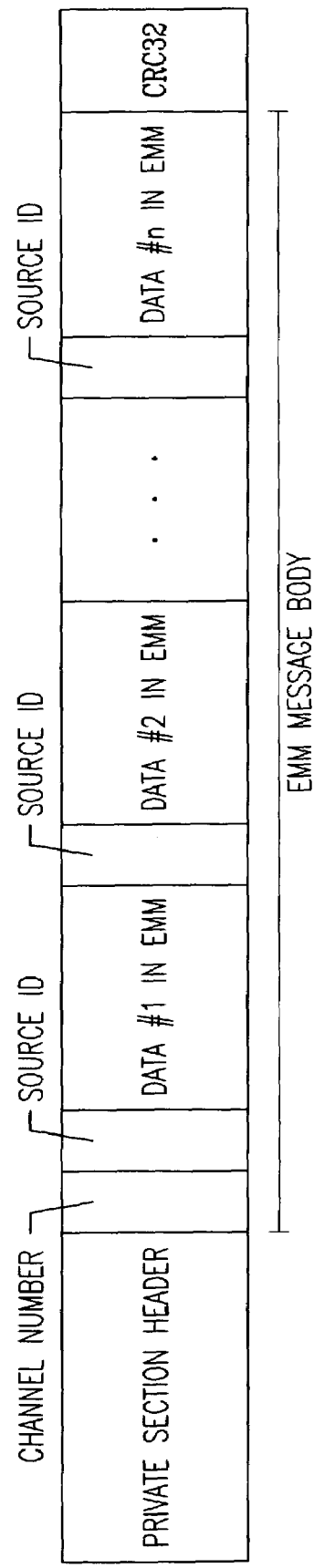
FIG. 4 is a structure map of data for EMM transmission in accordance with an embodiment of the present invention.

FIG. 4 shows the entire structure of the EMM according to the embodiment of the present invention, and FIG. 5 shows the detailed structure of the EMM shown in FIG. 4.

The structure of the package-based EMM is composed of, as shown in FIG. 4, MPEG-2 private sections specified in the SCTE, and it includes all the EMMs of the included channels by packages for periodic transmission.

The EMM according to the embodiment of the present invention comprises a private section header, a message body, and a CRC (Cyclic Redundancy Check)_32.

Referring to FIG. 5, the respective fields constituting the private section header are defined as follows:

(1) The table ID field table_ID designates, as table_ID, a specific value of 0×80 to 0×BF as specified in the SCTE. This field makes the restricted reception device recognize that the private section is an EMM.

(2) The section syntax indicator field section_syntax_indicator is an indicator specifying that the following field is a section field, and always has a value of "1".

(3) The section length field section_length specifies the total length of the section.

(4) The table extension field table_extension is not used, and always has a value of "0".

(5) The version number field version_number specifies version information, and increases by one whenever the EMM is periodically updated.

(6) The current-next indicator field current_next_indicator always has a value of "1".

(7) The section number field section_number specifies the number of a corresponding section for the EMM composed of multiple sections.

(8) The last section number field last_section_number specifies the number of the last section for the EMM composed of multiple sections.

(9) The protocol version field protocol_version specifies the protocol version, and is defined as "0" herein.

(10) The format identifier field format_identifier is a value obtained from the SCTE that identifies the syntax of this section.

The respective fields constituting the EMM message body are defined as follows.

(1) The channel number field number_of_channels specifies the number of channels for each EMM included in the section.

(2) The source ID field source_ID is an ID value used for identifying the EMM for each channel, and is necessary for acquiring an EMM for a specific channel in the restricted reception device.

(3) The EMM data field EMM_inside_data has information on the EMM for each channel.

On the other hand, the CRC_32 has a value specified in the MPEG-2 system.

In the embodiment of the present invention, the EMM has the above-stated structure, and is periodically transferred through an out-of-band channel.

Figure 6:
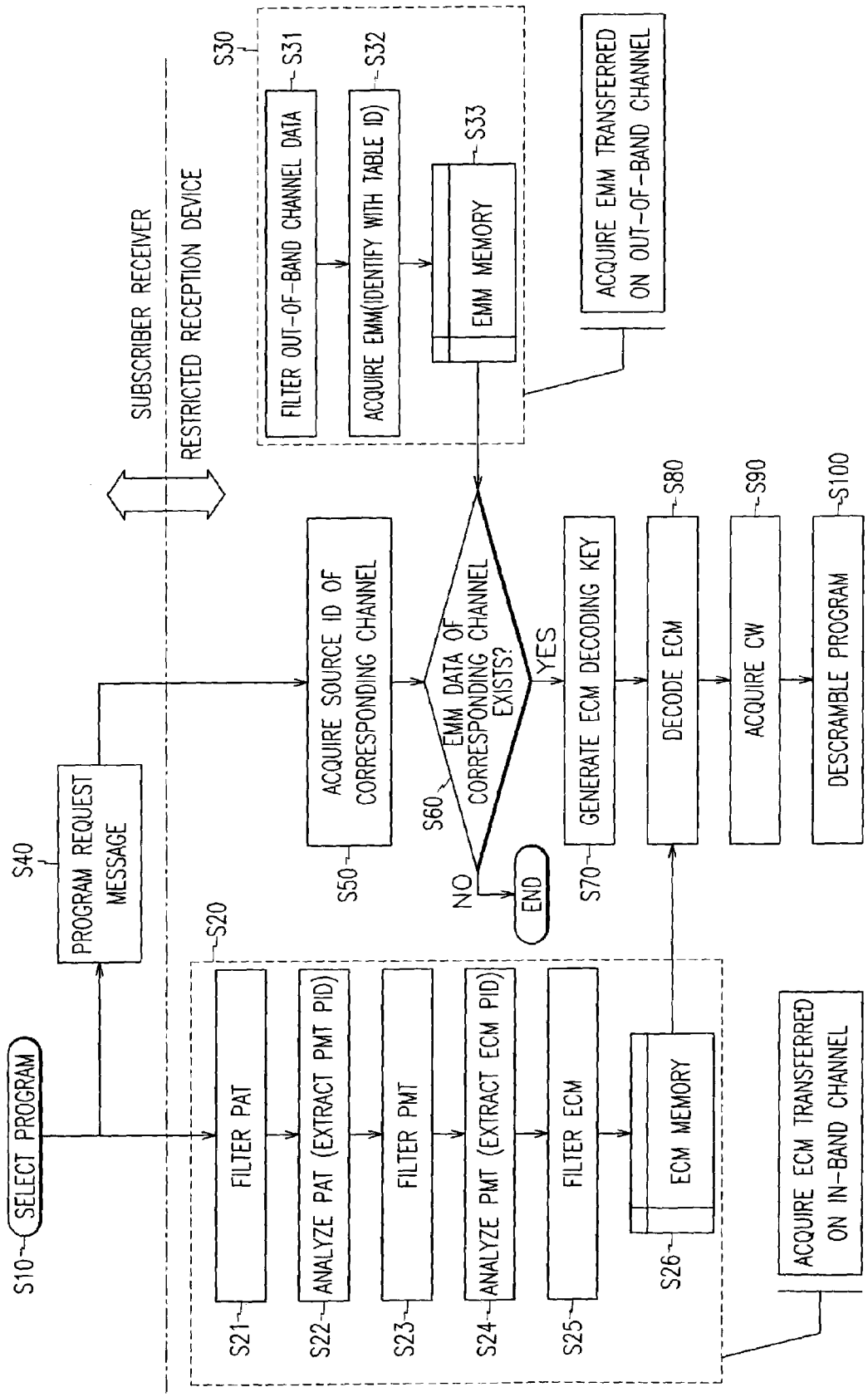
FIG. 6 is a flow chart of a restricted reception method of a receiver in accordance with an embodiment of the present invention.

FIG. 6 is a flow chart sequentially showing a restricted reception processing method of the reception system according to the embodiment of the present invention.

When a subscriber selects a specific chargeable channel, the in-band channel receiver 312 of the subscriber receiver 310 receives signals on an in-band channel for transferring broadcasting data, obtains ECM data from signals on the in-band channel by an ECM extraction method of the MPEG-2 system, and stores the extracted ECM in the ECM memory 602 of the restricted reception device 320 (in steps 10 and 20).

More specifically, the subscriber receiver 310 searches a TS packet including a PAT table in a broadcasting data stream to parse the PAT table, acquires the PID value of a PMT table of the corresponding program, and searches a TS packet having the PID value to parse the PMT table (in steps 21 to 24). After acquiring the PID value of the ECM-including TS packet by analyzing the PMT table, the subscriber receiver 310 searches the ECM-including TS packet to obtain the ECM (in step 25). The ECM thus obtained is stored in the ECM memory 602.

The EMM is transmitted through an out-of-band channel used for transferring auxiliary data and bi-directional communication data (in step 30).

The out-of-band receiver 314 of the subscriber receiver 310 receives a section transferred through the out-of-band channel and provides the received section to the out-of-band channel signal processor 323 of the restricted reception device 320. Unlike the MPEG-2 system that searches the EMM with reference to the CAT table, the embodiment of the present invention causes the out-of-channel signal processor 323 of the restricted reception device 320 to check the table ID field in the header of the received section and to determine that the currently received private section is an EMM.

The EMM is periodically updated for the sake of security. Once the received private section is determined as an EMM, the out-of-channel signal processor 323 of the restricted reception device 320 checks from the version number field of the received EMM section whether or not the EMM is updated. If the EMM is updated, then the data must be fed into the restricted reception processor 325. Upon receiving the updated EMM, the restricted reception processor 325 sequentially stores the source ID and the EMM data in the EMM memory 603. Namely, the EMM memory stores the EMM data of the served channels as divided by source IDs (in steps 31, 32 and 33).

If the subscriber receiver 310 selects a specific channel after acquiring the ECM transferred on the in-band channel and the EMM on the out-of-band channel, then the message having information on the selected channel is provided to the restricted reception device 320 (in step 40).

Upon receiving the message, the controller 324 of the restricted reception device 320 acquires the source ID of the selected channel from the message (in step 50). Then, the controller 324 searches the EMM memory 603 in which the EMM data for the respective channels are stored by source IDs, to acquire the EMM data of the corresponding channel (in step 60).

If it is determined that the EMM memory 603 stores the EMM data of the corresponding channel, then the TS processing module 601 of the restricted reception processor 325 determines whether or not the TS packet data transferred through the in-band channel are currently scrambled. If the TS packet data are scrambled, then the controller 324 provides the EMM data of the corresponding channel to the key matrix module 604.

The key matrix module 604 generates a key for decoding the ECM based on the input EMM data and provides the generated key to the descrambling module 605 (in step 70).

The descrambling module 605 decodes the ECM data from the ECM memory 602 based on the key received from the key matrix module 604 to acquire a CW (in steps 80 and 90). The descrambling module 605 uses the CW to descramble the scrambled TS data received from the TS processing module 601 (in step 100).

The descrambled TS data are fed into the demultiplexer 311 of the subscriber receiver 310 via the remultiplexer 321 and converted to an audiovisual form.

The operation stops if the EMM memory 603 does not store the EMM data of the corresponding channel according to the step 60. Namely, when the user selects another chargeable channel rather than the subscribed channel, there is no EMM data for the selected channel in the EMM memory, making it impossible to provide the channel in an audiovisual form.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention provides a method for efficiently extracting and processing EMM data in providing a restricted reception service that transmits data through an out-of-band channel by DVS-167 or DOCSIS in a digital cable broadcasting system of the OpenCable standard.

In addition, the present invention process restricts reception by a most preferable method in the cable broadcasting system, and provides EMMs of the channels corresponding to the respective subscribers especially when the cable service provider offers services by channels or packages (channel packages), thereby conveniently providing a restricted reception service to the subscribers.

What is claimed is:

1. A subscriber receiver for selectively receiving broadcasting data transferred via a digital cable broadcasting network comprising:
   a restricted reception device including:
   a demultiplexer for receiving broadcasting data and an ECM (Entitlement Control Message) including a CW (Control Word) from the subscriber receiver, and demultiplexing them, the broadcasting data and the ECM being transferred through an in-band channel;
   an out-of-band channel signal processor for receiving an EMM (Entitlement Management Message) from the subscriber receiver, and processing the received EMM, the EMM being transferred through an out-of-band channel;
   a restricted reception processor for descrambling the scrambled broadcasting data using the ECM and the EMM received from the out-of-band channel signal processor; and
   a remultiplexer for multiplexing the descrambled broadcasting data received from the restricted reception processor, and sending the multiplexed broadcasting data to the subscriber receiver.

2. The restricted reception device as claimed in claim 1, wherein the restricted reception processor comprises:
   an ECM memory for storing the ECM data; an EMM memory for storing EMM data of all channels being served to the subscriber receiver; a TS (Transport Stream) processing module for analyzing broadcasting data received from the demultiplexer to determine whether or not the broadcasting data are scrambled;
   a key matrix module for receiving the EMM data of a channel requested by the subscriber receiver from the EMM memory, and generating a key for decoding the ECM received from the ECM memory; and
   a descrambling module for decoding the ECM based on the key to generate a CW, descrambling the broadcasting data using the CW, and providing the descrambled broadcasting data to the remultiplexer.

3. The restricted reception device as claimed in claim 2, wherein the EMM transferred through the out-of-band channel comprises:
   a private section header including a table ID for storing information specifying that a corresponding section is an EMM, and version information of the EMM;
   a message body including a source ID specifying a channel allocated for data and the corresponding EMM; and
   an error check unit.

4. The restricted reception device as claimed in claim 3, wherein the out-of-band channel signal processor checks the version information included in the private section header of the EMM received through the out-of-band channel to determine whether or not the EMM is changed, and stores the received EMM in the EMM memory when the EMM is changed.

5. The restricted reception device as claimed in claim 3, wherein the EMM memory stores EMM data by source IDs of channels, and upon receiving information on a selected channel from the subscriber receiver, the key matrix module analyzing the information to generate a source ID, analyzing the EMM memory based on the generated source ID, and searching EMM data corresponding to the source ID to generate a key.

6. A reception system, which receives broadcasting data transferred from a digital cable broadcasting system, the reception system comprising:
   a subscriber receiver; and a restricted reception device, the subscriber receiver comprising: an in-band channel receiver for receiving broadcasting data and a CW-including ECM transferred from the broadcasting system through an in-band channel, and demodulating the broadcasting data and the ECM; an out-of-band channel receiver for receiving an EMM transferred through an out-of-band channel, and demodulating the received EMM; and a first demultiplexer for demultiplexing the multiplexed broadcasting data into an audiovisual form, the restricted reception device comprising:

a second demultiplexer for demultiplexing the broadcasting data and the ECM received from the subscriber receiver; an out-of-band channel signal processor for processing the EMM received from the subscriber receiver; a restricted reception processor for descrambling the scrambled broadcasting data using the ECM and the EMM; and a remultiplexer for multiplexing the descrambled broadcasting data received from the restricted reception processor and sending the multiplexed broadcasting data to the subscriber receiver.

7. The reception system as claimed in claim 6, wherein the restricted reception processor comprises:

an ECM memory for storing the ECM data; an EMM memory for storing the EMM data of all channels served to the subscriber receiver; a TS processing module for analyzing the broadcasting data received from the demultiplexer to determine whether or not the broadcasting data are scrambled;

a key matrix module for receiving the EMM of a channel requested by the subscriber receiver from the EMM memory, and generating a key for decoding the ECM received from the ECM memory; and a scrambling module for decoding the ECM based on the key to generate a CW, descrambling the broadcasting data using the CW, and sending the descrambled broadcasting data to the remultiplexer.

8. The reception system as claimed in claim 7, wherein the EMM transferred through the out-of-band channel comprises:

a private section header including a table ID for storing information specifying that a corresponding section is an EMM, and version information of the EMM;

a message body including a source ID specifying a channel allocated for data and the corresponding EMM; and an error check unit.

9. The reception system as claimed in claim 7, wherein the subscriber receiver further comprises:

an out-of-band channel transmitter for transmitting a subscriber message from the restricted reception device through the out-of-band channel; and a controller for controlling reception and transmission operations of the subscriber receiver.

10. A reception method, which is for receiving broadcasting data transferred from a digital cable broadcasting system, the reception method comprising:

(a) when a subscriber selects a specific channel, receiving broadcasting data and a CW-including ECM transferred from the broadcasting system through an in-band channel, and storing the ECM in a first memory;

(b) receiving an EMM transferred from the broadcasting system through an out-of-band channel to determine whether or not the EMM is changed, and storing the EMM in a second memory when the EMM is changed;

(c) receiving the EMM of the channel selected by the subscriber from the second memory, and generating a key for decoding the ECM based on the EMM data;

(d) decoding the ECM based on the key to generate a CW, and descrambling the broadcasting data using the CW; and (e) converting the descrambled broadcasting data to an audiovisual form.

11. The reception method as claimed in claim 10, wherein the EMM transferred through the out-of-band channel comprises: a private section header including a table ID for storing information specifying that a corresponding section is an EMM, and version information of the EMM; a message body including a source ID specifying a channel allocated for data and the corresponding EMM; and an error check unit.

12. The reception method as claimed in claim 11, wherein the step (b) comprises: checking the table ID of the private section header transferred through the out-of-band channel to determine whether or not the received section is an EMM; checking the version information of the private section header to determine whether or not the EMM is changed, when the section is an EMM; and storing the received EMM by channels in the second memory, when the EMM is changed.

13. The reception method as claimed in claim 10, wherein the data transferred through the out-of-band channel are transferred according to either of DVS-167 or DOCSIS (Data-Over-Cable Service Interface Specifications).

* * * * *